(No Model.)
E. BERLINER.
ELECTRIC BATTERY FLUID.
No. 270,884. Patented Jan. 23, 1883.
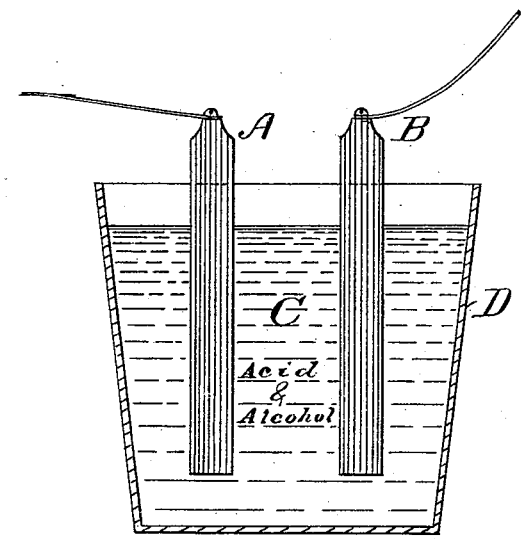
Attest.
Geo. Willis Pierce
C. H. M. Hazel.
Inventor:
Emile Berliner

UNITED STATES PATENT OFFICE.

EMILE BERLINER, OF BOSTON, MASSACHUSETTS.

ELECTRIC-BATTERY FLUID.

SPECIFICATION forming part of Letters Patent No. 270,884, dated January 23, 1883.

Application filed May 24, 1882. (No model.)

*To all whom it may concern:*

Be it known that I, EMILE BERLINER, of Boston, in the county of Suffolk and State of Massachusetts, have invented certain Improvements in Electric-Battery Fluids, of which the following is a specification.

This invention consists in adding to the ordinary acid solution of electric batteries alcoholic liquids—meaning all such compounds of carbon, oxygen, and hydrogen, which, when combined with acid, are capable to produce ether. I have found that a combination of acid and alcohol acts more powerful and rapid in certain cases where the ordinary acid acts slowly—as, for instance, in the formation of secondary batteries, or in all such cases where lead is employed as an electrode. It is, for example, well known that in the Planté secondary pile it takes a long time for the lead plates to become sufficiently oxidized for the purpose of taking in and holding an electric charge. By adding, however, alcohol to the ordinary solution of sulphuric acid and water this action is hastened and becomes instantaneous, and the lead plates rapidly oxidize under the influence of an electric current.

In the drawing, D is a vessel or cup. A and B are two electrodes—for instance, the two lead electrodes of a secondary battery. C is a solution of acid in water mixed with alcohol, or, in fact, any solution showing an acid reaction upon metal and containing an alcohol—meaning any compound of carbon, oxygen, and hydrogen which, when combined with an acid, is capable of producing ether.

It is well known that lead is very slowly attacked by sulphuric acid and water even under the action of electricity; but by adding alcohol the action becomes rapid and immediately oxidizes the lead. Hence in the formation of secondary batteries with lead electrodes, or in any other batteries where lead is to be acted upon by an acid reaction, the application of alcohol mixed in the solution becomes of great value.

I claim—

1. In a galvanic battery, a solution of acid, water, and alcohol mixed.

2. In a secondary pile, a mixture of acid and an alcohol.

3. In a secondary battery, a lead electrode immersed in a mixture of acid, water, and alcohol.

In testimony whereof I have signed my name to this specification, in the presence of two subscribing witnesses, this 8th day of May, 1882.

EMILE BERLINER.

Witnesses:
GEO. WILLIS PIERCE,
J. H. CHEEVER.